(12) United States Patent
Akagi et al.

(10) Patent No.: US 10,498,233 B2
(45) Date of Patent: Dec. 3, 2019

(54) BIDIRECTIONAL CHOPPER CIRCUIT

(71) Applicants: Tokyo Institute of Technology, Tokyo (JP); Toshiba-Mitsubishi-Electric Industrial Systems Corporation, Tokyo (JP)

(72) Inventors: Hirofumi Akagi, Tokyo (JP); Makoto Hagiwara, Tokyo (JP)

(73) Assignees: Tokyo Institute of Technology, Tokyo (JP); Toshiba-Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 15/756,770

(22) PCT Filed: Mar. 7, 2016

(86) PCT No.: PCT/JP2016/057005
§ 371 (c)(1),
(2) Date: Mar. 1, 2018

(87) PCT Pub. No.: WO2017/038122
PCT Pub. Date: Mar. 9, 2017

(65) Prior Publication Data
US 2018/0254699 A1 Sep. 6, 2018

(30) Foreign Application Priority Data

Sep. 2, 2015 (JP) .................................. 2015-172771

(51) Int. Cl.
*H02M 3/155* (2006.01)
*H02M 7/48* (2007.01)
(Continued)

(52) U.S. Cl.
CPC ........... *H02M 3/155* (2013.01); *H02M 1/088* (2013.01); *H02M 1/14* (2013.01); *H02M 7/48* (2013.01); *H02M 2007/4835* (2013.01)

(58) Field of Classification Search
CPC ....... H02M 3/155–158; H02M 3/1563; H02M 3/1584; H02M 3/1588; H02M 7/48;
(Continued)

(56) References Cited

U.S. PATENT DOCUMENTS 5,625,545 A * 4/1997 Hammond ............ H02M 3/285
363/65
7,940,540 B2 * 5/2011 Vinciarelli ............ H02M 3/157
323/265

(Continued)

FOREIGN PATENT DOCUMENTS

EP       2 784 927 A1    10/2014
WO   2013/026477 A1     2/2013
(Continued)

OTHER PUBLICATIONS

Li et al., "Development of chopper devices for regenerative energy storage systems", IEE-Japan Industry Applications Society Conference, 2014, 1-21, pp. I-123-I-126.
(Continued)

*Primary Examiner* — Yemane Mehari
(74) *Attorney, Agent, or Firm* — Kilpatrick Townsend & Stockton LLP (57) ABSTRACT

A bidirectional chopper circuit 1 is provided with: a main power converter 11 having a first switch 21-1 and a second switch 21-2 set up so that one switch is turned off when the other switch is turned on and connected in series with each other so as to line up in a conduction direction when turned on, the terminals on both sides of the main power converter 11 on the opposite sides to the connection sides for the first (Continued)

switch 21-1 and the second switch 21-2 being a pair of first external connection terminals; a plurality of single-phase full-bridge power converters 22-*j* and a pair of second external connection terminals provided on wiring that branches from wiring connecting the first switch 21-1 and the second switch 21-2 so that one or both are connected in cascade; and an inductor 13 connected in series with the single-phase full-bridge power converters 22-*j* on wiring that branches from wiring connecting the first switch 21-1 and the second switch 21-2.

8 Claims, 7 Drawing Sheets

(51) Int. Cl.
  *H02M 1/088* (2006.01)
  *H02M 1/14* (2006.01)
  *H02M 7/483* (2007.01)

(58) Field of Classification Search
  CPC ............... H02M 1/088; H02M 1/14; H02M 2007/4835; Y02B 70/1466; G05F 1/51; G05F 1/63; G01R 19/32
  USPC ................................. 323/282–285
  See application file for complete search history.

(56) References Cited

U.S. PATENT DOCUMENTS

| | | |
|---|---|---|
| 2009/0102439 A1 | 4/2009 | Williams |
| 2012/0026767 A1* | 2/2012 | Inoue .................... H02M 7/217 363/89 |
| 2012/0319478 A1 | 12/2012 | Gentchev et al. |
| 2014/0320104 A1 | 10/2014 | Guo |
| 2017/0302068 A1* | 10/2017 | Kubouchi ............ H02H 7/1222 |

FOREIGN PATENT DOCUMENTS

| | | |
|---|---|---|
| WO | 2014/017902 A2 | 1/2014 |
| WO | 2016/029824 A1 | 3/2016 |

OTHER PUBLICATIONS

Taguchi et al., "Experimental results on SOC estimation of the lithium-ion battery boarded on a contact-wire and battery hybrid LRV (contact-wire-less LRV)", IEE-Japan Industry Applications Society Conference, 2008, 3-17, pp. III-183-III-186.
European Application No. 16841155.1, Extended European Search Report dated Mar. 18, 2019, 2 pages.

\* cited by examiner

BIDIRECTIONAL CHOPPER CIRCUIT

CROSS-REFERENCE TO RELATED APPLICATIONS

This application is a 371 National Stage of International Application No. PCT/JP2016/057005, filed Mar. 7, 2016, which claims priority to Japanese Application No. JP 2015-172771, filed Sep. 2, 2015, both of which are hereby incorporated by reference in their entireties for all purposes.

TECHNICAL FIELD

The present invention relates to a bidirectional chopper circuit that bi-directionally performs voltage conversion between a first DC voltage across a pair of first external connection terminals and a second DC voltage across a pair of second external connection terminals.

BACKGROUND ART

In recent years, battery energy storage systems have been employed more and more in DC electric railroads (see non-patent literature 1 and 2 for instance). For example, by using a high-capacity lithium-ion battery mounted on a railcar, a travel distance of 25 [km] or more per charge can be achieved even when no power is supplied from contact wires.

Figure 11:
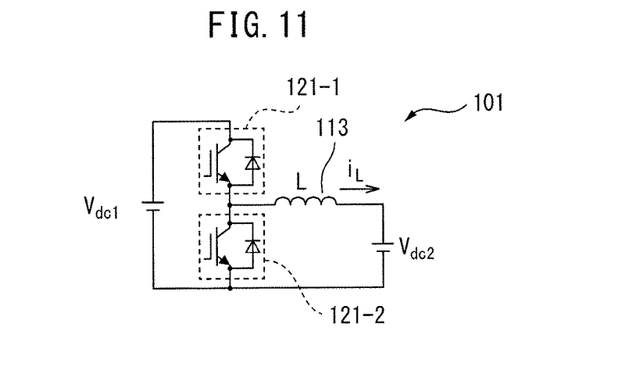
FIG. 11 is a circuit diagram of a common bidirectional chopper circuit.

In general, a voltage of contact wires for a DC electric railroad and an operating voltage of an energy accumulation element are different; therefore, voltage conversion (power conversion) is required using a bidirectional chopper circuit. FIG. 11 is a circuit diagram of a common bidirectional chopper circuit. A bidirectional chopper circuit 101 includes a first switching unit (positive-side valve device) 121-1 and a second switching unit (negative-side valve device) 121-2, which are connected in series with each other so that conduction directions in an ON state are aligned and one of which is turned OFF when the other is turned ON, and an inductor 113 connected to a connecting point of the first switching unit 121-1 and the second switching unit 121-2. Each of the first switching unit 121-1 and the second switching unit 121-2 consists of a semiconductor switching device that conducts in one direction when it is ON and a feedback diode connected in antiparallel with the semiconductor switching device. In a case of a DC electric railroad including a battery energy storage system, a high-voltage side DC voltage $V_{dc1}$ corresponds to a voltage of contact wires while a low-voltage side DC voltage $V_{dc2}$ corresponds to an operating voltage of an energy accumulation element. For example, when a standard voltage of contact wires is $V_{dc1}$=1500 [V], $V_{dc2}$ is set anywhere from 600 [V] to 700 [V]. In recent years, large-capacity bidirectional choppers with a converter capacity of 500 [kW] per single unit have been developed. In this case, a DC component of an inductor current $i_L$ is 500 [A] or higher.

CITATIONS LIST

Non-Patent Literature

Non-Patent literature 1: Yoshiaki Taguchi, Noriko Fukuda, Masamichi Ogasa, "Experimental results on SOC estimation of the lithium-ion battery boarded on a contact-wire and battery hybrid LRV (contact-wire-less LRV)", TEE-Japan Industry Applications Society Conference, 3-17, pp. 111-183-111-186, 2008

Non-Patent literature 2: Zhaofeng Li, Shunichiro Hoshina, Masayuki Nogi, Nobuhiko Satake, "Development of chopper devices for regenerative energy storage systems" (Kaisei chikuden shisutemuyou choppa souchi no kaihatsu), IEE-Japan Industry Applications Society Conference, 1-21, pp. 1-123-1-126, 2014

SUMMARY OF INVENTION

Technical Problem

In bidirectional chopper circuits, reducing the size and weight of inductors is an important issue, and it is particularly important when a bidirectional chopper circuit is installed on a moving object such as a railcar for a DC electric railroad. Since the weight and volume of an inductor are proportional to stored energy, reduction in size and weight can be achieved by reducing an inductance of the inductor. However, reducing the inductance causes a ripple current contained in the current flowing through the inductor to increase, and may cause deterioration in power quality and an unstable operation of a converter.

For example, in FIG. 11, a magnitude (variation range) of a ripple current $I_{Lripple}$ contained in a current $i_L$ flowing through the inductor 113 may be expressed as an equation 1 where a switching frequency (carrier frequency) is $f_{SM}$ and a duty ratio of the first switching unit 121-1 is d.

[Math. 1]
$$I_{Lripple} = \frac{V_{dc1}}{Lf_{SM}}d(1-d) \tag{1}$$

In the equation 1, the duty ratio d is determined in accordance with a high-voltage side DC voltage $V_{dc1}$ and a low-voltage side DC voltage $V_{dc2}$. Therefore, in order to reduce the ripple current $I_{Lripple}$ contained in the current $i_L$ flowing through the inductor 113 without increasing an inductance L of the inductor 113, the switching frequency (carrier frequency) $f_{SM}$ needs to be increased. For example, when a contact wire voltage is 1500 [V], an IGBT rated at 3.3 [kV] is commonly employed. A carrier frequency of such an IGBT (Insulated Gate Bipolar Transistor) is set to 1 [kHz] or lower in order to reduce switching loss. Thus, it is difficult to reduce the ripple current by increasing the carrier frequency. Although a method using a multiphase and multiplex chopper and a method using a coupled inductor have been proposed as methods to reduce the ripple current when applying the same carrier frequency, it is difficult to reduce the size and weight of inductors with these methods.

In addition, in a case of a common battery energy storage system as illustrated in FIG. 11, occurrence of a short-circuit fault in the second switching unit 121-2 may allow a short-circuit current to flow into the second switching unit 121-2 from the side of the low-voltage side DC voltage $V_{dc2}$ on which an energy accumulation element is located. For protecting the converter from such a short-circuit current, a possible measure is to provide a DC circuit breaker in series with the inductor 113 as described in non-patent literature 2 to electrically disconnect the energy accumulation element on the side of the low-voltage side DC voltage $V_{dc2}$ and the bidirectional chopper 101. However, providing such DC circuit breaker may lead to increasing a cost of the battery energy storage system.

Thus, an object of the present invention is to provide a low-cost bidirectional chopper circuit including an inductor with a reduced size and weight in view of the aforementioned problem.

Solution to Problem

To achieve the aforementioned object, in the present invention, a bidirectional chopper circuit that bi-directionally performs voltage conversion between a first DC voltage across a pair of first external connection terminals and a second DC voltage across a pair of second external connection terminals includes a main power converter including a first switching unit and a second switching unit, which are connected in series with each other so that conduction directions in an ON state are aligned and one of which is turned OFF when the other is turned ON, the main power converter having, as the first external connection terminals, both terminals on a side opposite to a side on which the first switching unit and the second switching unit are connected; one or a plurality of single-phase full-bridge power converters cascaded with each other provided on a wiring line that branches from a wiring line connecting the first switching unit and the second switching unit; and an inductor connected in series with the single-phase full-bridge power converter on the wiring line that branches from the wiring line connecting the first switching unit and the second switching unit, and is provided with a pair of second external connection terminals at any position on the wiring line that branches from the wiring line connecting the first switching unit and the second switching unit and is provided with the inductor and the single-phase full-bridge power converter.

To an AC input/output side of the single-phase full-bridge power converter, an inductor or another single-phase full-bridge power converter different from the single-phase full-bridge power converter is connected while to a DC input/output side, a DC capacitor is connected.

The bidirectional chopper circuit may include a control unit for the main power converter that controls duty ratios of the first switching unit and the second switching unit in the main power converter so that a current flowing through the inductor follows a predetermined command value, and a control unit for the single-phase full-bridge power converter that controls a power conversion operation of the single-phase full-bridge power converter so that an AC voltage for canceling an AC voltage component of the voltage appearing at the connecting point of the first switching unit and the second switching unit in the main power converter is output while a DC voltage of the DC capacitor is held at a predetermined voltage.

Furthermore, each of the first switching unit and the second switching unit may consist of a semiconductor switching device that conducts in one direction when it is ON and a feedback diode connected in antiparallel with the semiconductor switching device.

In addition, either one of the first external connection terminals and the second external connection terminals is connected to a DC power supply while the other is connected to a load or another DC power supply.

Advantageous Effects of Invention

According to the present invention, an inductance of a bidirectional chopper circuit may be reduced in size and weight and a low-cost bidirectional chopper circuit can be achieved.

According to the present invention, by providing an auxiliary power converter in the bidirectional chopper circuit, a ripple component of a current flowing through the inductor may be reduced. As a result, reduction in size and weight of the inductor in the bidirectional chopper circuit may be achieved.

Battery energy storage systems including a conventional bidirectional chopper circuit have required a countermeasure in which a DC circuit breaker is installed in the battery energy storage system to prevent a potential inflow of a short-circuit current when a short-circuit fault occurs in the switching unit (see non-patent literature 1 for instance). In contrast to this, according to the present invention, since a side into which the short-circuit current flows (for example, a side on which the energy accumulation element is located) and the main power converter may be electrically disconnected by turning OFF all semiconductor switching devices in respective single-phase full-bridge power converters, separate installation of the DC circuit breaker is not required, thereby achieving a significantly lower cost.

DESCRIPTION OF EMBODIMENTS

Figure 1:
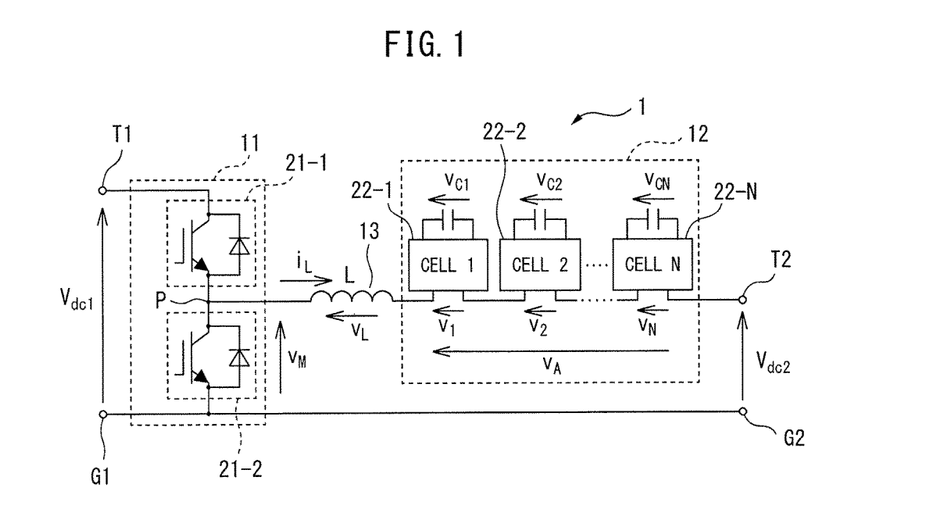
FIG. 1 is a circuit diagram illustrating a bidirectional chopper circuit according to an example of the present invention.
Figure 2:
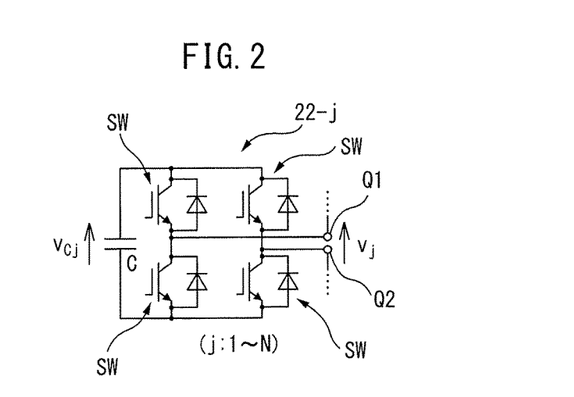
FIG. 2 is a circuit diagram illustrating a single-phase full-bridge power converter (bridge cell) in the bidirectional chopper circuit illustrated in FIG. 1.

FIG. 1 is a circuit diagram illustrating a bidirectional chopper circuit according to an example of the present invention, and FIG. 2 is a circuit diagram illustrating a single-phase full-bridge power converter (bridge cell) in the bidirectional chopper circuit illustrated in FIG. 1. Hereinafter, the same reference numerals in different drawings denote components having the same functions.

A bidirectional chopper circuit 1 according to an example of the present invention bi-directionally performs voltage conversion between a first DC voltage $V_{dc1}$ across a pair of first external connection terminals T1 and G1 and a second DC voltage $V_{dc2}$ across a pair of second external connection terminals T2 and G2. Either one of the first external connection terminals T1 and G1 and the second external connection terminals T2 and G2 is connected to a DC power supply while the other is connected to a load or another DC power supply.

For example, when a DC power supply is connected to the first external connection terminals T1 and G1 and a load is connected to the second external connection terminals T2 and G2, the bidirectional chopper circuit 1 operates as a step-down chopper. In this case, a voltage output by the DC power supply is the first DC voltage $V_{dc1}$ and a voltage applied to the load is the second DC voltage $V_{dc2}$.

For example, when a load is connected to the first external connection terminals T1 and G1 and a DC power supply is connected to the second external connection terminals T2 and G2, the bidirectional chopper circuit 1 operates as a step-up chopper. In this case, a voltage applied to the load is the first DC voltage $V_{dc1}$ and a voltage output by the DC power supply is the second DC voltage $V_{dc2}$.

Furthermore, for example, a DC power supply may be connected to the first external connection terminals T1 and G1 and another DC power supply may be connected to the second external connection terminals T2 and G2.

The bidirectional chopper circuit 1 includes a main power converter 11, an auxiliary power converter 12, and an inductor 13.

The main power converter 11 includes a first switching unit (positive-side valve device) 21-1 and a second switching unit (negative-side valve device) 21-2. Each of the first switching unit 21-1 and the second switching unit 21-2 consists of a semiconductor switching device that conducts in one direction when it is ON and a feedback diode connected in antiparallel with the semiconductor switching device. Examples of the semiconductor switching device include an IGBT, a SiC (Silicon Carbide)-MOSFET (Metal-Oxide-Semiconductor Field-Effect Transistor), a thyristor, a GTO (Gate Turn-off Thyristor), a transistor, etc.; however, the type of the semiconductor switching device itself does not limit the present invention and other types of semiconductor devices may be employed. The first switching unit 21-1 and the second switching unit 21-2 are connected in series with each other so that conduction directions of the semiconductor switching devices are aligned. The first switching unit 21-1 and the second switching unit 21-2 are controlled so that either semiconductor switching device is turned ON while the other semiconductor switching device is turned OFF. The connecting point of the first switching unit 21-1 and the second switching unit 21-2 is denoted by P. A voltage appearing at both ends of the second switching unit (negative-side valve device) 21-2 (i.e., a potential difference between the ground terminal G1 and the connecting point P) is denoted by $v_M$. For example, when a DC power supply is connected to the first external connection terminals T1 and G1 and a load is connected to the second external connection terminals T2 and G2, a voltage output by the main power converter 11 is $v_M$.

Both terminals on a side opposite to a side on which the first switching unit 21-1 and the second switching unit 21-2 are connected are assumed to be the first external connection terminals T1 and G1.

The auxiliary power converter 12 is provided on a wiring line that branches from the connecting point P on the wiring line connecting the first switching unit 21-1 and the second switching unit 21-2. The auxiliary power converter 12 consists of one or a plurality of single-phase full-bridge power converters (bridge cells) 22-$j$ cascaded with each other. Hereinafter, j is a natural number from 1 to N; in other words, N is the cascade number of the single-phase full-bridge power converters (bridge cells). As illustrated in FIG. 2, the bridge cell 22-$j$ is configured as a single-phase full-bridge circuit in which two sets of two serially connected semiconductor switches SW connected in parallel and a DC capacitor C are connected in parallel. The semiconductor switch SW consists of a semiconductor switching device that conducts in one direction when it is ON and a feedback diode connected in antiparallel with the semiconductor switching device. Examples of the semiconductor switching device include an IGBT, a SiC-MOSFET, a thyristor, a GTO (Gate Turn-off Thyristor), a transistor, etc.; however, the type of the semiconductor switching device itself does not limit the present invention and other types of semiconductor devices may be employed. Points in respective sets of two serially connected semiconductor switches SW at which the semiconductor switches are connected in series are assumed to be input/output terminals Q1 and Q2 for current to be discharged from the DC capacitor C or to be charged in the DC capacitor C. In other words, by way of the input/output terminals Q1 and Q2 that are located on an AC input/output side of each single-phase full-bridge power converter 22-$j$, another single-phase full-bridge power converter different from the single-phase full-bridge power converter or an inductor 13 to be described later is connected. The DC capacitor C is connected to a DC input/output side of each single-phase full-bridge power converter 22-$j$. The single-phase full-bridge power converter 21-$j$ illustrated in FIG. 1 is illustrated, to facilitate understanding, such that the DC capacitor C in the single-phase full-bridge power converter 21-$j$ illustrated in FIG. 2 is located outside the single-phase full-bridge power converter 21-$j$. It is assumed that a voltage of the DC capacitor in each single-phase full-bridge power converter 21-$j$ is $v_{C_j}$, a voltage on the AC input/output side of each single-phase full-bridge power converter 21-$j$ (i.e., a voltage applied at both ends of the input/output terminals Q1 and Q2) is $v_j$.

The inductor 13 is connected in series with the single-phase full-bridge power converter 22-$j$ on the wiring line that branches from the connecting point P on the wiring line connecting the first switching unit 21-1 and the second switching unit 21-2 in the main power converter 11. It is assumed that a voltage applied to both ends of the inductor 13 is $v_L$. It should be noted that, when a DC power supply is connected to the first external connection terminals T1 and G1 and an RL load (inductive load) is connected to the second external connection terminals T2 and G2, an inductance component of the RL load may substitute for the inductor 13; in this case, the inductor 13 may be omitted.

At any position on the wiring line that branches from the connecting point P on the wiring line connecting the first switching unit 21-1 and the second switching unit 21-2 in the main power converter 11 and is provided with the inductor 13 and the single-phase full-bridge power converter 22-$j$, second external connection terminals T2 and G2 are provided.

Figure 3A:
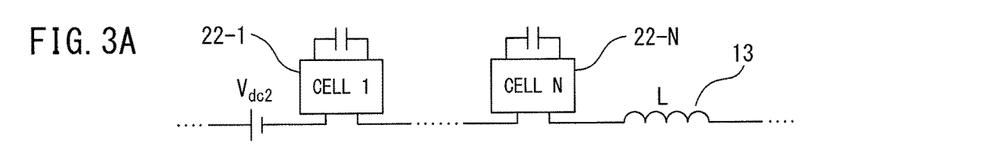
FIG. 3A is a circuit diagram (part 1) illustrating an example of arrangement of the single-phase full-bridge power converters, an inductor, and second external connection terminals.
Figure 3B:
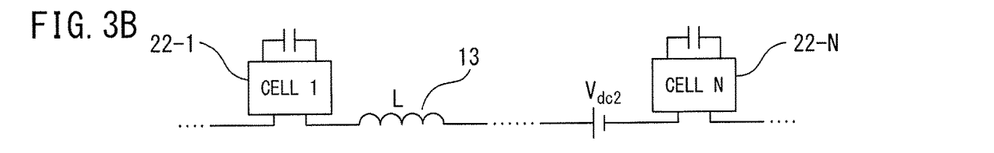
FIG. 3B is a circuit diagram (part 2) illustrating an example of arrangement of the single-phase full-bridge power converters, the inductor, and the second external connection terminals.
Figure 3C:
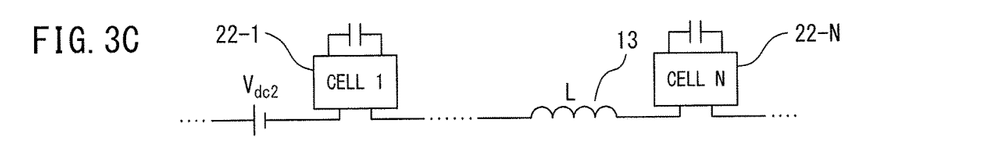
FIG. 3C is a circuit diagram (part 3) illustrating an example of arrangement of the single-phase full-bridge power converters, the inductor, and the second external connection terminals.

Thus, the single-phase full-bridge power converter 22-$j$, the inductor 13, and the second external connection terminals T2 and G2 are provided on the same wiring line that branches from the connecting point P on the wiring line connecting the first switching unit 21-1 and the second switching unit 21-2 in the main power converter 11. In the example illustrated in FIG. 1, the inductor 13 is disposed between the main power converter 11 and the single-phase full-bridge power converter 22-1, and the second external connection terminals T2 and G2 are disposed on a side, of the auxiliary power converter 12, opposite to the side where the inductor 13 is connected with the auxiliary power converter 12 (i.e., a side, of the single-phase full-bridge power converter 22-N, opposite to a side where the single-phase full-bridge power converter 22-(N-1) is connected with the single-phase full-bridge power converter 22-N); however, arrangement of the single-phase full-bridge power converter 22-$j$, the inductor 13, and the second external connection terminals T2 and G2 may be freely designed. FIG. 3A to FIG. 3C are circuit diagrams illustrating examples of arrangement of the single-phase full-bridge power converters, the inductor, and the second external connection terminals. In FIG. 3A to FIG. 3C, the second external connection terminals T2 and G2 are represented by the DC voltage $V_{dc2}$ to facilitate understanding. As described above, the low-voltage side DC voltage $V_{dc2}$ is the voltage of the DC power supply or the load.

In the example illustrated in FIG. 3A, the inductor 13 is disposed on the right side of the single-phase full-bridge power converter 22-N in the diagram, and the low-voltage side DC voltage $V_{dc2}$ (i.e., the second external connection terminals T2 and G2) is disposed on the left side of the single-phase full-bridge power converter 22-1 in the diagram. In the example illustrated in FIG. 3B, the inductor 13 is disposed on the right side of the single-phase full-bridge power converter 22-1 in the diagram, and the low-voltage side DC voltage $V_{dc2}$ (i.e., the second external connection terminals T2 and G2) is disposed on the left side of the single-phase full-bridge power converter 22-N in the diagram. In the example illustrated in FIG. 3C, the inductor 13 is disposed on the left side of the single-phase full-bridge power converter 22-N in the diagram, and the low-voltage side DC voltage $V_{dc2}$ (i.e., the second external connection terminals T2 and G2) is disposed on the left side of the single-phase full-bridge power converter 22-1 in the diagram.

Figure 4:
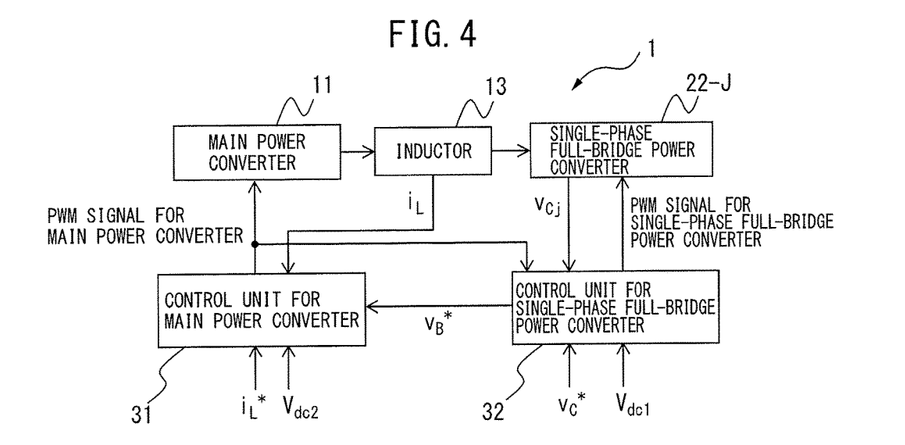
FIG. 4 is a functional block diagram illustrating control of the bidirectional chopper circuit according to the example of the present invention.

Next, control of the bidirectional chopper circuit 1 according to an example of the present invention will be described. FIG. 4 is a functional block diagram illustrating the control of the bidirectional chopper circuit according to the example of the present invention. The bidirectional chopper circuit 1 includes, as its control system, a control unit 31 for the main power converter and a control unit 32 for the single-phase full-bridge power converter.

The control unit 31 for the main power converter controls duty ratios of the first switching unit 21-1 and the second switching unit 21-2 in the main power converter 11 so that a current $i_L$ flowing through the inductor 13 follows a predetermined command value $i_L^*$. On the basis of the duty ratios set by the control unit 31 for the main power converter, a PWM (Pulse Width Modulation) signal for controlling a switching operation of each semiconductor switching device in the first switching unit 21-1 and the second switching unit 21-2 is determined.

The control unit 32 for the single-phase full-bridge power converter controls a power conversion operation of the single-phase full-bridge power converter 22-$j$ so that an AC voltage for canceling an AC voltage component of the voltage appearing at the connecting point P of the first switching unit 21-1 and the second switching unit 21-2 in the main power converter 11 is output while a DC voltage $v_{Cj}$ of the DC capacitor C is held at a predetermined voltage.

First, fundamental operations of the main power converter 11 and the control unit 31 for the main power converter will be described as follows. In description of the fundamental operations, the following assumptions are introduced. In other words, PWM control is applied to switching control of the semiconductor switching devices in the first switching unit 21-1 and the second switching unit 21-2 in the main power converter 11, and the switching frequency (carrier frequency) is assumed to be $f_{SM}$. The semiconductor switching device is assumed to operate as an ideal switch. In respective equations that hold for the first switching unit 21-1 and the second switching unit 21-2, to facilitate understanding, the first switching unit 21-1 is denoted by S1 and the second switching unit 21-2 is denoted by S2.

In the main power converter 11, a voltage $v_M$ appearing at both ends of the second switching unit (negative-side valve device) 21-2 (i.e., a potential difference between the ground terminal G1 and the connecting point P) is expressed as an equation 2.

[Math. 2]

$$v_M = \begin{cases} V_{dc1} & (S1: \text{on}, S2: \text{off}) \\ 0 & (S1: \text{off}, S2: \text{on}) \end{cases} \quad (2)$$

From the equation 2, it is found that the voltage $v_M$ appearing at both ends of the second switching unit 21-2 is composed of a DC voltage component $v_{Mdc}$ and an AC voltage component $v_{Mac}$. To resolve the voltage $v_M$ appearing at both ends of the second switching unit 21-2 into the DC voltage component $v_{Mdc}$ and the AC voltage component $v_{Mac}$, an approximation expression as an equation 3 is applied.

[Math. 3]

$$v_{Mdc} = dV_{dc1} \quad (3)$$

In the equation 3, d represents a duty ratio (instantaneous value) of the first switching unit 21-1. The equation 3 holds when a temporal variation of the duty ratio d in a single carrier period is sufficiently small.

From the equation 2 and the equation 3, the AC voltage component $v_{Mac}$ contained in the voltage $v_M$ appearing at both ends of the second switching unit 21-2 may be expressed as an equation 4.

[Math. 4]

$$v_{Mac} = \begin{cases} (1-d)V_{dc1} & (S1: \text{on}, S2: \text{off}) \\ -dV_{dc1} & (S1: \text{off}, S2: \text{on}) \end{cases} \quad (4)$$

As can be seen from the equation 4, the AC voltage component $v_{Mac}$ contained in the voltage $v_M$ appearing at both ends of the second switching unit 21-2 is in a form of a square wave. When the auxiliary power converter 12 is not used, the entire AC voltage component $v_{Mac}$ is applied to the inductor 13; however, in the example of the present invention, the power conversion of the single-phase full-bridge power converter 22-$j$ in the auxiliary power converter 12 is controlled by the control unit 32 for the single-phase full-bridge power converter so that the AC voltage component applied to the inductor 13 becomes zero.

Fundamental operations of the auxiliary power converter 12 and the control unit 32 for the single-phase full-bridge power converter will be described as follows. In description of the fundamental operations, the following assumptions are introduced. In other words, PWM control is applied to switching control of the semiconductor switching devices in each single-phase full-bridge power converter 22-$j$ in the auxiliary power converter 12, and the switching frequency (carrier frequency) is assumed to be $f_{SA}$. The semiconductor switching device is assumed to operate as an ideal switch. In addition, it is assumed that a DC voltage component of the DC capacitor voltage in each single-phase full-bridge power converter 22-$j$ is held at a constant value $V_C$ and an AC voltage component of each DC capacitor voltage is zero.

To cause the AC voltage component applied to the inductor 13 to be zero, the auxiliary power converter 12 outputs an AC voltage that has the same magnitude as the AC voltage component $v_{Mac}$ output by the main power converter 11. In other words, when the voltage output by the auxiliary power converter 12 is $v_A$ and the AC voltage component thereof is $v_{Aac}$, the AC voltage component $v_{Aac}$ of the voltage $v_A$ output by the auxiliary power converter 12 can be expressed as an equation 5 in the same form as the equation 4.

[Math. 5]

$$v_{Aac} = \begin{cases} (1-d)V_{dc1} & (S1: \text{on}, S2: \text{off}) \\ -dV_{dc1} & (S1: \text{off}, S2: \text{on}) \end{cases} \quad (5)$$

The AC voltage component $v_{Mac}$ that is output by the main power converter 11 and expressed as the equation 4 and the AC voltage component $v_{Aac}$ that is output by the auxiliary power converter 12 and expressed as the equation 5 cancel each other; as a result, the AC voltage applied to the inductor 13 becomes zero.

It should be noted that the voltage $v_A$ output by the auxiliary power converter 12 actually contains a ripple voltage generated by a PWM-controlled switching operation of the semiconductor switching devices in the single-phase full-bridge power converter 22-$j$ in the auxiliary power converter 12 in addition to the AC voltage component $v_{Aac}$ expressed as the equation 5. The ripple voltage is applied to both ends of the inductor 13 and will be a factor to generate the ripple current. The effect of the ripple voltage may be minimized by applying a "phase-shift PWM control" for shifting an initial phase of the triangle-wave carrier by 180°/N when the switching operation of the semiconductor switching devices in the single-phase full-bridge power converter 22-$j$ in the auxiliary power converter 12 is performed by PWM control. When phase-shift PWM control is applied, a voltage variation range (voltage step) of the ripple voltage is $V_C$. The frequency of the ripple voltage is $2Nf_{SA}$. When it is assumed that the ripple voltage contained in the voltage $v_A$ output by the auxiliary power converter 12 is $v_{Aripple}$ and $v_{Aripple}$ is a square-wave voltage that has the same length of positive voltage periods and negative voltage periods, an equation 6 is obtained.

[Math. 6]

$$v_{Aripple} = \begin{cases} \dfrac{V_c}{2} & \left(0 < t < \dfrac{1}{4Nf_{SA}}\right) \\ -\dfrac{V_c}{2} & \left(\dfrac{1}{4Nf_{SA}} < t < \dfrac{1}{2Nf_{SA}}\right) \end{cases} \quad (6)$$

In this case, a magnitude $I_{Lripple}$ of the ripple current is expressed as an equation 7.

[Math. 7]

$$I_{Lripple} = \dfrac{1}{L}\int_0^{\frac{1}{4Nf_{SA}}} \dfrac{V_c}{2} dt = \dfrac{V_c}{8LNf_{SA}} \quad (7)$$

From the equation 1 and the equation 7, a ratio $I_w/I_{w/o}$ of the magnitude of the ripple current in a case of employing the auxiliary power converter 12 to that of the ripple current in a case of not employing the auxiliary power converter 12 is expressed as an equation 8.

[Math. 8]

$$\dfrac{I_{w/}}{I_{w/o}} = \dfrac{V_c f_{SM}}{8NV_{dc1}f_{SA}d(1-d)} \quad (8)$$

From the equation 8, it is found that the ripple current may be reduced by appropriately selecting the DC voltage component $V_C$ of the DC voltage of each DC capacitor in the single-phase full-bridge power converter 22-$j$, the cascade number N of the single-phase full-bridge power converter 22-$j$, the switching frequency (carrier frequency) $f_{SM}$ used in PWM control of the main power converter 11, and the switching frequency (carrier frequency) $f_{SA}$ used in PWM control of the single-phase full-bridge power converter 22-$j$. Next, selection of these parameters will be described.

First, the DC voltage component $V_C$ of the DC voltage of each DC capacitor in the single-phase full-bridge power converter 22-$j$ and the cascade number N of the single-phase full-bridge power converter 22-$j$ will be described.

In the auxiliary power converter 12, a relation expressed as an equation 9 holds between the voltage $v_A$ output by the auxiliary power converter 12 and the DC component $V_C$ of the DC voltage of each DC capacitor in the single-phase full-bridge power converter 22-$j$ in the auxiliary power converter 12.

[Math. 9]

$$-NV_C \le v_A \le NV_C \quad (9)$$

From the equation 5 and the equation 9, the DC voltage component $V_C$ of the DC voltage of each DC capacitor in the single-phase full-bridge power converter 22-$j$ preferably satisfies an equation 10.

[Math. 10]

$$\frac{(1-d)V_{dc1}}{N} \leqq V_c \quad (10)$$
$$\frac{dV_{dc1}}{N} \leqq V_c$$

In the equation 10, the duty ratio d is determined in accordance with a high-voltage side DC voltage $V_{dc1}$ and a low-voltage side DC voltage $V_{dc2}$. For example, when the high-voltage side DC voltage is $V_{dc1}=1500$ [V] and the low-voltage side DC voltage is $V_{dc2}=600$ [V], the duty ratio d is 0.4. In contrast, the DC voltage component $V_C$ of the DC voltage of each DC capacitor in the single-phase full-bridge power converter 22-$j$ and the cascade number N of the single-phase full-bridge power converter 22-$j$ may be freely set as long as they satisfy the equation 10. When the cascade number N of the single-phase full-bridge power converter 22-$j$ is set to a large number, the DC component $V_C$ of the DC voltage of each DC capacitor in the single-phase full-bridge power converter 22-$j$ may be set to a small value in accordance with the equation 10. As a result, the ripple current may be reduced in accordance with the equation 8. It should be noted that, when the cascade number N of the single-phase full-bridge power converter 22-$j$ is set to a large number, the number of the converters becomes large and the cost increases. Therefore, the DC component $V_C$ of the DC voltage of each DC capacitor in the single-phase full-bridge power converter 22-$j$ and the cascade number N of the single-phase full-bridge power converter 22-$j$ may be selected, for example, in view of trade-off between reducing the ripple current and reducing the cost.

Next, the switching frequency $f_{SM}$ used in PWM control of the main power converter 11 and the switching frequency $f_{SA}$ used in PWM control of the single-phase full-bridge power converter 22-$j$ will be described.

The switching frequency $f_{SM}$ used in PWM control of the main power converter 11 is determined in accordance with switching characteristics of the semiconductor switching device to be used. For example, it is usually set to 1 [kHz] or lower in a case of an IGBT rated at 3.3 [kV].

In contrast, with respect to the switching frequency $f_{SA}$ used in PWM control of the single-phase full-bridge power converter 22-$j$, $f_{SM}$ and $f_{SA}$ preferably satisfy an equation 11 since each single-phase full-bridge power converter 22-$j$ needs to generate a square-wave voltage of the frequency $f_{SM}$ by PWM control.

[Math. 11]

$$f_{SM} \leqq f_{SA} \quad (11)$$

A rated voltage of the semiconductor switching device used for the auxiliary power converter 12 may be set to a value lower than the rated voltage of the semiconductor switching device used for the main power converter 11 by appropriately selecting the cascade number N of the single-phase full-bridge power converter 22-$j$. When the high-voltage side DC voltage is $V_{dc1}=1500$ [V] and the cascade number N of the single-phase full-bridge power converter 22-$j$ is N=3, the DC component $V_C$ of the DC voltage of each DC capacitor in the single-phase full-bridge power converter 22-$j$ is 500 [V] at a maximum from the equation 10. In this case, it is assumed that an IGBT rated at 1.2 [kV] or a SiC-MOSFET rated at 1.2 [kV], for example, is employed. These semiconductor switching devices are superior in switching characteristics to IGBTs rated at 3.3 [kV], easily satisfying the equation 11.

Next, selection of the duty ratio d will be described.

It is assumed that the loss at the main power converter 11 is zero and the current $i_L$ flowing through the inductor 13 is composed of the DC current component only (i.e., $i_L=I_L$). From the equation 3, the output power $P_M$ of the main power converter 11 may be expressed as equation 12.

[Math. 12]

$$P_M = v_{Mdc}I_L = dV_{dc1}I_L \quad (12)$$

The output power $P_M$ of the main power converter 11 is equal to the output power of the entire bidirectional chopper circuit 1. In contrast, the output power $P_A$ of the auxiliary power converter 12 is a product of an effective value $v_{Arms}$ of the voltage $v_A$ output by the auxiliary power converter 12 and the current $I_L$ flowing through the inductor 13. From the equation 5, the effective value $v_{Arms}$ of the output voltage of the auxiliary power converter 12 may be expressed as an equation 13.

[Math. 13]

$$v_{Arms} = \sqrt{d(1-d)}V_{dc1} \quad (13)$$

From the equation 13, the output power $P_A$ of the auxiliary power converter 12 may be expressed as an equation 14.

[Math. 14]

$$P_A = v_{Arms}I_L = \sqrt{d(1-d)}V_{dc1}I_L \quad (14)$$

From the equation 12 and the equation 14, a ratio $P_{ratio}$ of the output power $P_A$ of the auxiliary power converter 12 to the output power $P_M$ of the main power converter 11 may be expressed as an equation 15.

[Math. 15]

$$P_{ratio} = \frac{P_A}{P_M} = \sqrt{\frac{1-d}{d}} \quad (15)$$

Figure 5:
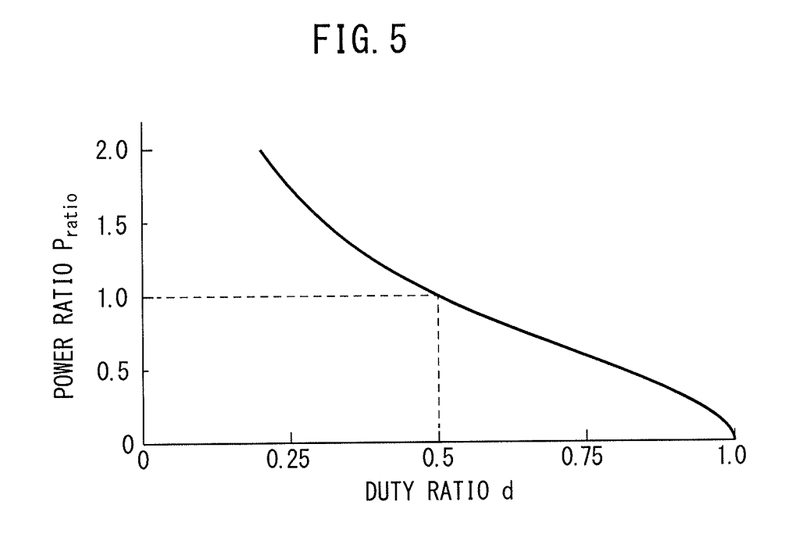
FIG. 5 is a diagram illustrating a relationship between a duty ratio and a power ratio.

FIG. 5 is a diagram illustrating a relationship between the duty ratio and a power ratio. When the duty ratio d is 0.5 or lower, the output power of the auxiliary power converter 12 is higher than the output power of the main power converter 11. On the other hand, when the duty ratio d is 0.5 or higher, the output power of the auxiliary power converter 12 is lower than the output power of the main power converter 11. Therefore, in terms of reducing the converter power, the duty ratio is preferably 0.5 or higher.

Figure 6:
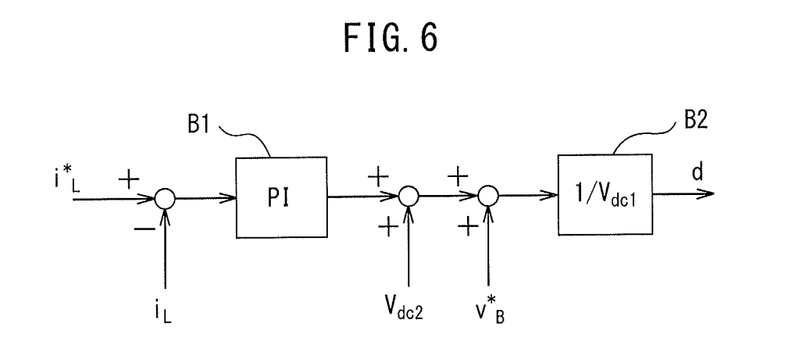
FIG. 6 is a block diagram illustrating control of a main power converter in the bidirectional chopper circuit according to the example of the present invention.
Figure 7:
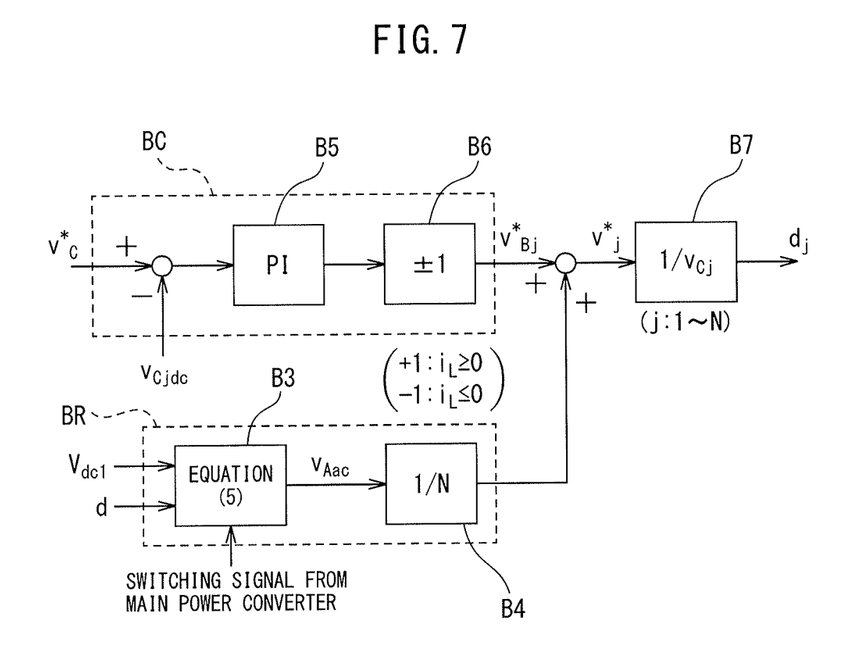
FIG. 7 is a block diagram illustrating control of the single-phase full-bridge power converter in the bidirectional chopper circuit according to the example of the present invention.

Next, a specific control block diagram of the bidirectional chopper circuit 1 according to the example of the present invention will be described. FIG. 6 is a block diagram illustrating control of the main power converter in the bidirectional chopper circuit according to the example of the present invention while FIG. 7 is a block diagram illustrating control of the single-phase full-bridge power converter in the bidirectional chopper circuit according to the example of the present invention.

The control of the bidirectional chopper circuit 1 is made up of control of the DC current contained in the current $i_L$ flowing through the inductor 13, suppression control of the ripple current contained in the current $i_L$ flowing through the inductor 13, and constant voltage control of the DC capacitor in the single-phase full-bridge power converter 22-j. Among them, the control of the DC current contained in the current $i_L$ flowing through the inductor 13 is performed by the control unit 31 for the main power converter. The suppression control of the ripple current contained in the current $i_L$ flowing through the inductor 13 and the constant voltage control of the DC capacitor in the single-phase full-bridge power converter 22-j are performed by the control unit 32 for the single-phase full-bridge power converter.

First, the control of the DC current contained in the current $i_L$ flowing through the inductor 13 performed by the control unit 31 for the main power converter will be described with reference to FIG. 6.

The DC current control of the current $i_L$ flowing through the inductor 13 is achieved by controlling the duty ratios d of the first switching unit 21-1 and the second switching unit 21-2 in the main power converter 11. More specifically, in a block B1, by applying PI (Proportional-Integral) control to a difference between the current $i_L$ flowing through the inductor 13, which is detected by a current detector (not illustrated), and the command value $i_L^*$, feedback control is performed to cause the current $i_L$ flowing through the inductor 13 to follow the command value $i_L^*$. Subsequently, after $V_{dc2}$ and $v_B^*$ are added to the signal output from the block B1 as a feedforward term, a block B2 performs normalization with the high-voltage side DC voltage $V_{dc1}$ to determine the duty ratio d. On the basis of the duty ratio d, a PWM signal for controlling the switching operation of each semiconductor switching device in the first switching unit 21-1 and the second switching unit 21-2 is determined. One of the feedforward terms, $v_B^*$, which will be described in detail later, represents a voltage term (command value) output by the auxiliary power converter 12 and is used to achieve decoupling the control of the main power converter 11 and the control of the auxiliary power converter 12.

Next, the suppression control of the ripple current contained in the current $i_L$ flowing through the inductor 13 performed by the control unit 32 for the single-phase full-bridge power converter and the constant voltage control of the DC capacitor in the single-phase full-bridge power converter 22-j will be described with reference to FIG. 7.

A block BR for suppression control of the ripple current consists of blocks B3 and B4. The block B3 outputs the AC voltage $v_{Aac}$ given by the equation 5. At the time of output, the block changes polarity of $v_{Aac}$ according to a switching signal from the main power converter 11. The block B4 divides the AC voltage $v_{Aac}$ by the cascade number N of the single-phase full-bridge power converter 22-j.

The voltage $v_A$ output by the auxiliary power converter 12 ideally contains only an AC voltage component. In contrast, the current $i_L$ flowing through the inductor 13 ideally contains only a DC current component. Thus, no DC power is formed by the voltage $v_A$ output by the auxiliary power converter 12 and the current $i_L$ flowing through the inductor 13. In other words, the DC component of the voltage of the DC capacitor in the single-phase full-bridge power converter 22-j ideally does not vary. However, since the DC component actually varies due to the influence of loss in the auxiliary power converter 12, the block BC for controlling the DC capacitor voltage is executed to suppress this variation. More specifically, by applying PI control to a difference between the DC component $v_{Cjdc}$ contained in each voltage $v_{Cj}$ of the DC capacitor and the command value $v_C^*$ in the block B5, feedback control is performed to cause the DC component $v_{Cjdc}$ contained in each voltage $v_{Cj}$ of the DC capacitor to follow the command value $v_C^*$. The DC component $v_{Cjdc}$ contained in each voltage $v_{Cj}$ of the DC capacitor can be calculated by applying a moving average filter or a low-pass filter to each voltage $v_{Cj}$ of the DC capacitor detected by a voltage detector (not illustrated). Since the frequency of the AC voltage contained in each voltage $v_{Cj}$ of the DC capacitor is equal to $f_{CM}$, when a moving average filter is used, a filter frequency may be set to $f_{CM}$.

From the block BC for controlling the DC capacitor voltage, a voltage command value $v_{Bj}^*$ for controlling the DC capacitor voltage is output. An actual voltage $v_{Bj}(=v_{Bj}^*)$ forms an active power with the inductor current $i_L$. When "$v_{Bj} \times i_L$" is positive, a positive active power flows into the DC capacitor and the DC component $v_{Cjdc}$ contained in each voltage $v_{Cj}$ of the DC capacitor increases. When "$v_{Bj} \times i_L$" is negative, a negative active power flows into the DC capacitor and the DC component $v_{Cjdc}$ contained in each voltage $v_{Cj}$ of the DC capacitor decreases. Therefore, the block BC for controlling the DC capacitor voltage utilizes this characteristic to control the DC voltage of each DC capacitor. In this case, when the polarity of the current $i_L$ flowing through the inductor 13 changes, the polarity of $v_{Bj}$ to be output also changes, so that the polarity of $v_{Bj}$ is changed according to the polarity of the current $i_L$ flowing through the inductor 13 in the block B6. For example, when $v_C^* > v_{Cjdc}$, "$v_{Bj} \times i_L$" needs to be positive; therefore, in the block B6, positive $v_{Bj}$ is output when the current $i_L$ flowing through the inductor 13 is positive and negative $v_{Bj}$ is output when the current $i_L$ flowing through the inductor 13 is negative.

In the block BC for controlling the DC capacitor voltage, the command value $v_B^*$ for the voltage to be output by the auxiliary power converter 12 is expressed as an equation 16.

[Math. 16]

$$v_B^* = \sum_{j=1}^{N} v_{Bj}^* \tag{16}$$

Since the command value $v_B^*$ for the voltage to be output by the auxiliary power converter 12 is a DC voltage, interaction in the control with the main power converter 11 that similarly controls a DC voltage may be caused. To achieve decoupling of control, $v_B^*$ is given to the control unit 31 for the main power converter as a feedforward term as illustrated in FIG. 6. By so doing, the voltage terms $v_B$ ($=v_B^*$) output by the main power converter 11 and the auxiliary power converter 12 mutually cancel each other, and the control of the DC capacitor voltage performed by the auxiliary power converter 12 will not affect the DC current control of the current $i_L$ flowing through the inductor 13 performed by the main power converter 11.

Each voltage $v_{Cj}$ of the DC capacitor contains an AC voltage component $v_{Cjac}$ in addition to a DC voltage component $v_{Cjdc}$. Since the AC voltage component $v_{Cjac}$ is a factor that causes an overvoltage in the semiconductor switching device or saturation of the control system, the AC voltage component is preferably controlled appropriately. From FIG. 7, an AC voltage command value $v_j^*$ of the single-phase full-bridge power converter 22-j in the auxiliary power converter 12 is expressed as an equation 17.

[Math. 17]

$$v_j^* = v_{Bj}^* + \frac{v_{Aac}}{N} \quad (17)$$

In the equation 17, the first term on the right side is sufficiently small in comparison with the second term (for example, several percent or less). Therefore, $v_j^*$ may be approximated as an equation 18.

[Math. 18]

$$v_j^* \cong \frac{v_{Aac}}{N} \quad (18)$$

An instantaneous AC power $p_{ac}$ of each single-phase full-bridge power converter 22-$j$ in the auxiliary power converter 12 may be expressed as an equation 19 by using the equation 18.

[Math. 19]

$$p_{ac} = v_j i_L \cong v_j^* I_L = \frac{v_{Aac} I_L}{N} \quad (19)$$

In the equation 19, $v_j$ represents the AC voltage of each single-phase full-bridge power converter 22-$j$ in the auxiliary power converter 12. In $v_j$, a switching ripple component (the principal frequency is $f_{SA}$) generated due to PWM control is contained in addition to the AC voltage component (the frequency is $f_{SM}$) expressed by the equation 18. When $f_{SA}$ is sufficiently large in comparison with $f_{SM}$, an effect of the switching ripple component is negligible; therefore, the effect of the switching ripple component is not considered in the following equation or later.

An instantaneous DC power $p_{dc}$ of each bridge cell may be expressed as an equation 20.

[Math. 20]

$$p_{dc} = v_{Cj} C \frac{dv_{Cj}}{dt} \cong CV_c \frac{dv_{Cj}}{dt} \quad (20)$$

From the equation 19, the equation 20, and a relation of "$p_{ac}=p_{dc}$", $v_{Cj}$ may be expressed as an equation 21.

[Math. 21]

$$v_{Cj} = \frac{I_L}{CV_C N} \cdot \int v_{Aac} dt + V_C \quad (21)$$

In the equation 21, the first term on the right side corresponds to an AC component. From the equation 5 and the equation 21, the AC component of $v_{Cj}$ is in a form of a triangle wave. From the equation 5 and the equation 21, a variation range $v_{Cjripple}$ of the AC component may be expressed as an equation 22.

[Math. 22]

$$v_{Cjripple} = \frac{V_{dc1} I_L (1-d) T_{on}}{C V_C N} = \frac{V_{dc1} I_L d(1-d)}{C V_C N f_{SM}} \quad (22)$$

In the equation 22, Ton represents an ON time ($=d/f_{SM}$) of the first switching unit 21-1 of the main power converter 11. From the equation 22, the variation range is inversely proportional to $f_{SM}$. Therefore, by increasing the carrier frequency of the main power converter 11, a capacity C of the DC capacitor may be reduced.

A block B7 performs normalization of the AC voltage command value $v_j^*$ with each voltage $v_{Cj}$ of the DC capacitor to determine a duty ratio $d_j$. On the basis of the duty ratio $d_j$, a PWM signal for controlling the switching operation of each semiconductor switching device in the single-phase full-bridge power converter 22-$j$ in the auxiliary power converter 12 is determined.

Next, a simulation result of the bidirectional chopper circuit according to an example of the present invention will be described. In the simulation, "PSCAD/EMTDC" was used. Table 1 lists circuit constants used in the simulation.

TABLE 1

| Circuit parameters used in simulation | | |
| --- | --- | --- |
| Rated capacity | $P_M$, $P_A$ | 500 kW |
| DC voltage 1 | $V_{dc1}$ | 1.5 kV |
| DC voltage 2 | $V_{dc2}$ | 0.75 kV |
| Duty ratio | d | 0.5 |
| Rated inductor current | $I_L$ | 667 A |
| Inductance | L | 0.5 mH |
| Cascade number | N | 3 |
| DC capacitor voltage | $V_c$ | 0.35 kV |
| Capacitance | C | 10 mF |
| Unit capacitance constant | H | 3.7 ms |
| Carrier frequency (main power converter) | $f_{SM}$ | 450 Hz |
| Carrier frequency (auxiliary power converter) | $f_{SA}$ | 1800 Hz |

The high-voltage side DC voltage $V_{dc1}$ was set to 1.5 [kV], the low-voltage side DC voltage $V_{dc2}$ was set to 0.75 [kV], and the duty ratio d was set to 0.5. In this case, "$P_M=P_A$" is derived from FIG. 5. The DC capacitor voltage $V_C$ was set to 350 [V] with reference to the equation 10. In this case, as a semiconductor switching device in the single-phase full-bridge power converter 22-$j$ in the auxiliary power converter 12, an IGBT rated at 1.2 [kV] or a SiC-MOSFET rated at 1.2 [kV] may be employed. A unit capacitance constant H is a value obtained by normalizing an entire electrostatic energy of the DC capacitor with the capacitance of the converter, and it may be expressed as an equation 23.

[Math. 23]

$$H = \frac{\frac{1}{2} C V_C^2 N}{P_A} \quad (23)$$

The carrier frequency $f_{SM}$ of the main power converter 11 was set to 450 [Hz] assuming usage of an IGBT rated at 3.3 [kV]. The carrier frequency $f_{SA}$ of the auxiliary power converter 12 (each single-phase full-bridge power converter 22-$j$) was set to 1800 [Hz] assuming usage of an IGBT rated at 1.2 [kV]. In the simulation, a dead time of the semiconductor switching device was set to zero assuming usage of an analog control system having zero control delay.

Figure 8:
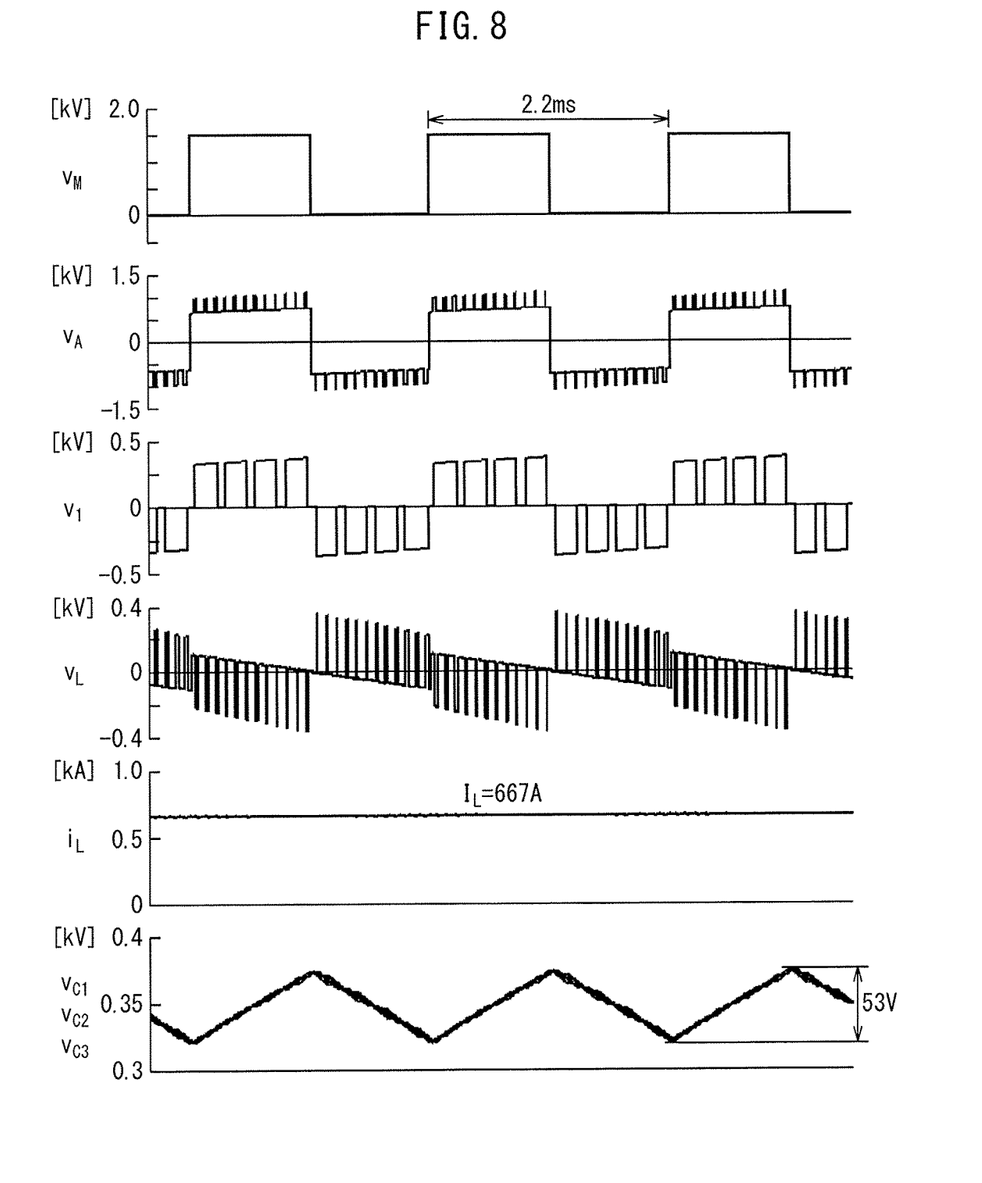
FIG. 8 is a diagram illustrating simulated waveforms when an active power is transmitted from a high-voltage side DC voltage $V_{dc1}$ to a low-voltage side DC voltage $V_{dc2}$ in the bidirectional chopper circuit according to the example of the present invention.

FIG. 8 is a diagram illustrating simulated waveforms when an active power is transmitted from the high-voltage side DC voltage $V_{dc1}$ to the low-voltage side DC voltage $V_{dc2}$ in the bidirectional chopper circuit according to the example of the present invention. In FIG. 8, waveforms of the voltage (i.e., a potential difference between the ground terminal G1 and the connecting point P) $v_M$ appearing at both ends of the second switching unit (negative-side valve device) 21-2, the voltage $v_A$ output by the auxiliary power converter 12, the voltage $v_1$ output by the single-phase full-bridge power converter 22-1 in the auxiliary power converter 12, the voltage $v_L$ applied to both ends of the inductor 13, and the voltage $v_{c1}$, $v_{c2}$, and $v_{c3}$ of respective DC capacitors in the single-phase full-bridge power converter 22-1, 22-2, and 22-3 in the auxiliary power converter 12. Since the duty ratio d is 0.5, it is derived from the equation 3 that the voltage $v_M$ appearing at both ends of the second switching unit 21-2 is 0.75 [kV]. In this case, it is found from the equation 5 that the voltage $v_A$ output by the auxiliary power converter 12 is a square-wave voltage having an amplitude of 0.75 [kV]. On the voltage $v_A$ output by the auxiliary power converter 12, a switching ripple voltage generated due to phase-shift PWM control is superimposed; as a result, the voltage step is equal to $V_C$. In this case, the frequency ($2Nf_{SA}$=10.8 [kHz]) of the ripple voltage contained in the voltage $v_A$ output by the auxiliary power converter 12 is three times the frequency ($2f_{SA}$=3.6 [kHz]) of the ripple voltage contained in the voltage $v_1$ output by the single-phase full-bridge power converter 22-1.

The voltage step of the voltage $v_L$ applied to both ends of the inductor 13 is equal to $V_C$ as described above and the frequency is 10.8 [kHz], which is an equivalent switching frequency. As a result, the ripple current contained in the current $i_L$ flowing through the inductor 13 is sufficiently small in comparison with the DC current component (667 [A]). DC voltage components of the voltages $v_{c1}$, $v_{c2}$, and $v_{c3}$ of respective DC capacitors in the single-phase full-bridge power converter 22-1, 22-2, and 22-3 successfully follow the command value of 350 [V]. The waveform of the AC component is in a form of a triangle wave as described above, and its frequency is equal to $f_{SM}$. When the circuit constants in Table 1 are substituted into the equation 22, $v_{Cjripple}$ is 53 [V], which successfully agrees with the simulation result illustrated in FIG. 8.

Figure 9A:
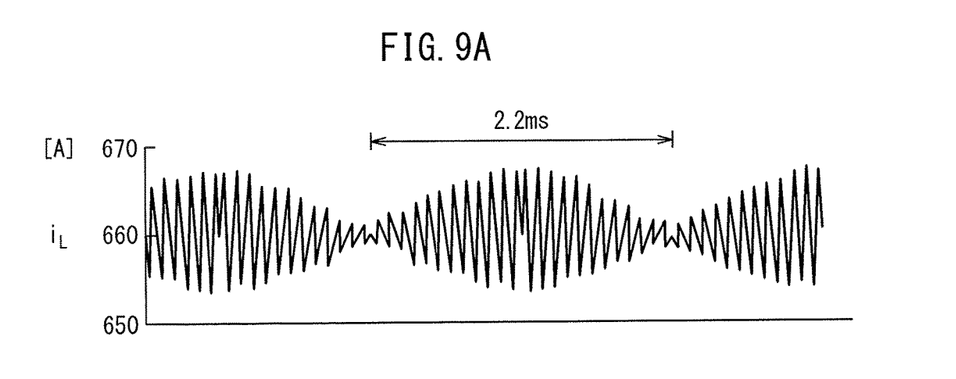
FIG. 9A is a diagram illustrating a simulated waveform for comparison of a waveform of an inductor current of the bidirectional chopper circuit according to the example of the present invention and a waveform of an inductor current of a conventional bidirectional chopper circuit, and illustrates the waveform of the inductor current of the bidirectional chopper circuit according to the example of the present invention.
Figure 9B:
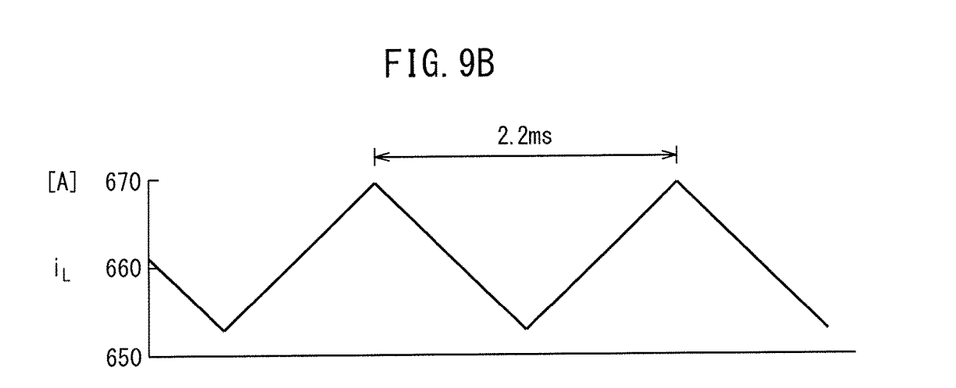
FIG. 9B is a diagram illustrating a simulated waveform for comparison of the waveform of the inductor current of the bidirectional chopper circuit according to the example of the present invention and the waveform of the inductor current of a conventional bidirectional chopper circuit, and illustrates the waveform of the inductor current of the conventional bidirectional chopper circuit.

FIG. 9A is a diagram illustrating a simulated waveform for comparison of the waveform of the inductor current of the bidirectional chopper circuit according to the example of the present invention and the waveform of the inductor current of the conventional bidirectional chopper circuit, and illustrates the waveform of the inductor current of the bidirectional chopper circuit according to the example of the present invention. FIG. 9B is a diagram illustrating a simulated waveform for comparison of the waveform of the inductor current of the bidirectional chopper circuit according to the example of the present invention and the waveform of the inductor current of a conventional bidirectional chopper circuit, and illustrates the waveform of the inductor current of the conventional bidirectional chopper circuit. In the bidirectional chopper circuit 1 including an auxiliary power converter 12 according to the example of the present invention, when the circuit constants in Table 1 are substituted into the equation 7, $I_{Lripple}$ is 16 [A], and an error is generated from 13 [A] of the simulation result illustrated in FIG. 9A. The reason for this is that $v_{Aripple}$ was assumed to be a square-wave voltage of 180-degree conduction as expressed in the equation 6. An actual conduction period of $v_{Aripple}$ is 180 degrees or less as illustrated in FIG. 8. In this case, the ripple current is smaller than the value derived from the equation 7. In other words, the equation 7 expresses the maximum value of the ripple current.

FIG. 9B illustrates the waveform of the inductor current of the conventional bidirectional chopper circuit not including an auxiliary power converter, and when the circuit constants in Table 1 are substituted into the equation 8, a ratio $I_w/I_{w/o}$ of the magnitude of the ripple current when the auxiliary power converter 12 is employed to the one when the auxiliary power converter 12 is not employed is 0.01. Therefore, to achieve an effect of reducing a ripple current in the conventional bidirectional chopper circuit not including an auxiliary power converter, which is equivalent to that in the bidirectional chopper circuit including an auxiliary power converter according to the example of the present invention, the inductance L of the inductor 13 is preferably 100 times higher. In view of this, in FIG. 9B, the inductance L of the inductor 13 was increased from 0.5 [mH] to 50 [mH]. The circuit constants other than the inductance L of the inductor 13 are similar to those in the bidirectional chopper circuit including an auxiliary power converter according to the example of the present invention in FIG. 9A. From comparison between FIG. 9A and FIG. 9B, the magnitudes of the ripple currents of both are equal. Thus, by introducing an auxiliary power converter as in the example of the present invention, the inductance L of the inductor 13 may be significantly reduced.

The bidirectional chopper circuit 1 according to the aforementioned example of the present invention performs voltage conversion from the high-voltage side DC voltage $V_{dc1}$ to the low-voltage side DC voltage $V_{dc2}$ or from the low-voltage side DC voltage $V_{dc2}$ to the high-voltage side DC voltage $V_{dc1}$; however, the bidirectional chopper circuit 1 may be, as a modification, an AC-AC converter circuit that directly converts AC voltage bi-directionally.

Figure 10:
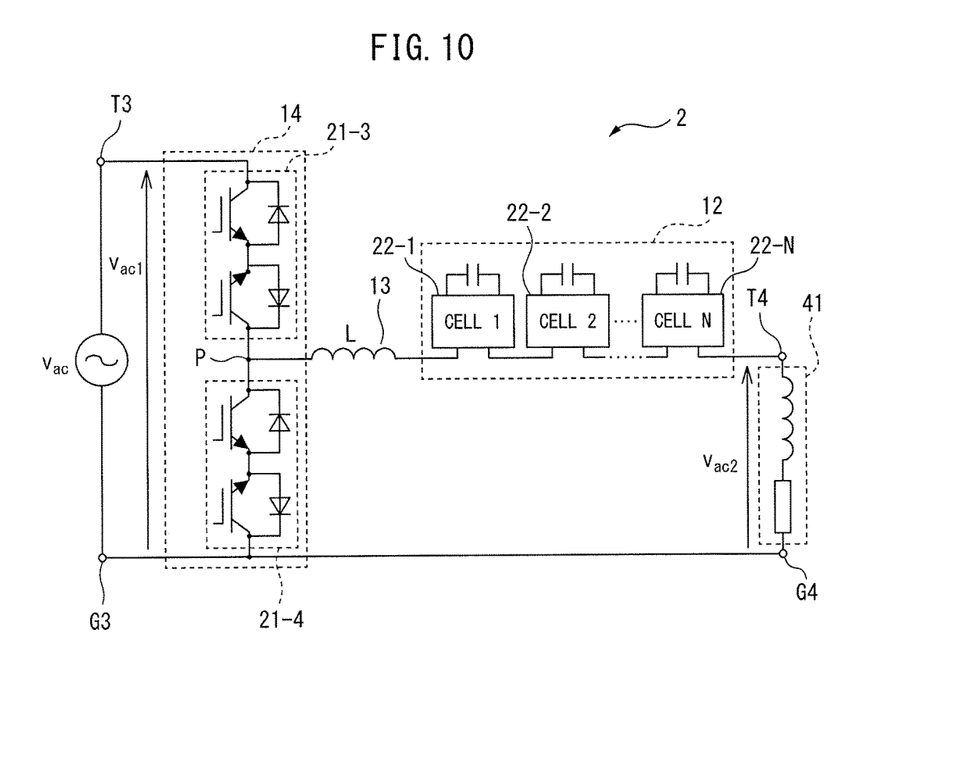
FIG. 10 is a circuit diagram illustrating an AC-AC converter circuit according to a modification of the example of the present invention.

FIG. 10 is a circuit diagram illustrating an AC-AC converter circuit according to a modification of the example of the present invention. An AC-AC converter circuit 2 according to the modification of the example of the present invention bi-directionally performs voltage conversion between a first AC voltage vac1 across a pair of third external connection terminals T3 and G3 and a second AC voltage vac2 across a pair of fourth external connection terminals T4 and G4. Either one of the third external connection terminals T3 and G3 and the fourth external connection terminals T4 and G4 is connected to an AC power supply while the other is connected to an AC load or another AC power supply. In the illustrated example, a case in which an AC power supply is connected to the third external connection terminals T3 and G3 while an AC load 41 is connected to the fourth external connection terminals T4 and G4 is illustrated; in this case, a step-down operation is performed. In a case in which an AC load is connected to the third external connection terminals T3 and G3 while an AC power supply is connected to the fourth external connection terminals T4 and G4, the AC-AC converter circuit 2 performs a step-up operation.

The AC-AC converter circuit 2 includes a main power converter 14, the auxiliary power converter 12, and the inductor 13.

The main power converter 14 includes a third switching unit (positive-side valve device) 21-3 and a fourth switching unit (negative-side valve device) 21-4. The third switching unit 21-3 may bi-directionally switch the conduction direction in an ON state while the fourth switching unit 21-4 is connected in series with the third switching unit 21-3 and may bi-directionally switch the conduction direction in an ON state. Each of the third switching unit 21-3 and the fourth switching unit 21-4 includes two units consisting of a semiconductor switching device that conducts in one direction when it is ON and a feedback diode connected in antiparallel with the semiconductor switching device, and these two units are connected in series with each other so that the conduction directions in an ON state are mutually reverse. Examples of the semiconductor switching device include an IGBT, a SiC-MOSFET, a thyristor, a GTO (Gate Turn-off thyristor), a transistor, etc.; however, the type of the semiconductor switching device itself does not limit the present invention and other types of semiconductor devices may be employed.

Both terminals on a side opposite to a side on which the third switching unit 21-3 and the fourth switching unit 21-4 are connected are assumed to be the third external connection terminals T3 and G3.

The auxiliary power converter 12 is provided on a wiring line that branches from the connecting point P on a wiring line connecting the third switching unit 21-3 and the fourth switching unit 21-4. The auxiliary power converter 12 consists of one or a plurality of single-phase full-bridge power converters (bridge cells) 22-j cascaded with each other. Since the specific configuration of the auxiliary power converter 12 is similar to the case of the bidirectional chopper circuit 1 in the first example of the present invention, description thereof is omitted.

The inductor 13 is connected in series with the single-phase full-bridge power converter 22-j on the wiring line that branches from the connecting point P on the wiring line connecting the third switching unit 21-3 and the fourth switching unit 21-4 in the main power converter 14. Since the specific configuration of the inductor 13 is similar to the case of the bidirectional chopper circuit 1 in the first example of the present invention, description thereof is omitted.

At any position on the wiring line that branches from the connecting point P on the wiring line connecting the third switching unit 21-3 and the fourth switching unit 21-4 in the main power converter 14 and is provided with the inductor 13 and the single-phase full-bridge power converter 22-j, the fourth external connection terminals T4 and G4 are provided.

Thus, on the same wiring line that branches from the connecting point P on the wiring line connecting the third switching unit 21-3 and the fourth switching unit 21-4 in the main power converter 14, the single-phase full-bridge power converter 22-j, the inductor 13, and the fourth external connection terminals T4 and G4 are provided. In the example illustrated in FIG. 10, the inductor 13 is disposed between the main power converter 14 and the single-phase full-bridge power converter 22-1, and the fourth external connection terminals T4 and G4 are disposed on a side, of the auxiliary power converter 12, opposite to the side where the inductor 13 is connected with the auxiliary power converter 12 (i.e., a side, of the single-phase full-bridge power converter 22-N, opposite to the side where the single-phase full-bridge power converter 22-(N−1) is connected with the single-phase full-bridge power converter 22-N); however, the arrangement order of the single-phase full-bridge power converter 22-j, the inductor 13, and the fourth external connection terminals T4 and G4 may be freely designed.

Since the control system of the AC-AC converter circuit 2 is also configured similarly to the control system of the bidirectional chopper circuit 1 that has been already described, description thereof is omitted.

As described above, the bidirectional chopper circuit 1 illustrated in FIG. 1 according to the example of the present invention includes the main power converter 11, the auxiliary power converter 12, and the inductor 13. The AC-AC converter circuit 2 illustrated in FIG. 10 according to the modification of the example of the present invention includes the main power converter 14, the auxiliary power converter 12, and the inductor 13. In other words, both of the bidirectional chopper circuit 1 and the AC-AC converter circuit 2 include an auxiliary power converter 12 consisting of a plurality of single-phase full-bridge power converters (bridge cells). Thus, even if, for example, a short-circuit fault occurs in the switching unit in the main power converter 11 or the main power converter 14, separate installation of a DC circuit breaker that has been disposed as a measure for a short-circuit current is not necessary since a side into which the short-circuit current flows (for example, a side where an energy accumulation element is located) and the main power converter 11 or the main power converter 14 may be electrically disconnected by turning OFF all semiconductor switching devices in respective single-phase full-bridge power converters; therefore, a significantly lower cost may be achieved.

REFERENCE SIGNS LIST 1 bidirectional chopper circuit
2 AC-AC converter circuit
11, 14 main power converter
12 auxiliary power converter
13 inductor
21-1 first switching unit
21-2 second switching unit
21-3 third switching unit
21-4 fourth switching unit
22-1, 22-2, 22-j, 22-N single-phase full-bridge power converter
31 control unit for main power converter
32 control unit for single-phase full-bridge power converter
P connecting point
Q1, Q2 input/output terminal
T1, G1 first external connection terminal
T2, G2 second external connection terminal
T3, G3 third external connection terminal
T4, G4 fourth external connection terminal

The invention claimed is:
1. A bidirectional chopper circuit that performs voltage conversion between a first DC voltage across a pair of first external connection terminals and a second DC voltage across a pair of second external connection terminals, comprising:
a main power converter including a first switching unit and a second switching unit, which are connected at a connecting point P in series with each other so that conduction directions in an ON state are aligned and one of which is turned OFF when the other is turned ON, the main power converter having, as the first external connection terminals, both terminals on a side opposite connecting point P;
one or a plurality of single-phase full-bridge power converters cascaded with each other provided on a wiring line that branches from connecting point P; and an inductor connected in series with the one or the plurality of single-phase full-bridge power converters on the wiring line that branches from connecting point P, wherein, at any position past the inductor and at least one of the one or the plurality of single-phase full-bridge power converters on the wiring line that branches from connecting point P, one of the second external connection terminals is provided.

2. The bidirectional chopper circuit according to claim 1, wherein an AC input/output side of a first single-phase full-bridge power converter of the one or the plurality of single-phase full-bridge power converters is connected with the inductor or another single-phase full-bridge power converter different from the first single-phase full-bridge power converter while on a DC input/output side, a DC capacitor is connected.

3. The bidirectional chopper circuit according to claim 1, wherein each of the first switching unit and the second switching unit comprises a semiconductor switching device that conducts in one direction when it is ON and a feedback diode connected in antiparallel with the semiconductor switching device.

4. The bidirectional chopper circuit according to claim 1, wherein either one of the first external connection terminals and the second external connection terminals is connected to a DC power supply while the other is connected to a load or another DC power supply.

5. The bidirectional chopper circuit according to claim 1, wherein the one or the plurality of single-phase full-bridge power converters is a plurality of single-phase full-bridge power converters cascaded with each other.

6. The bidirectional chopper circuit according to claim 1, further comprising:
a control unit for the main power converter configured to control duty ratios of the first switching unit and the second switching unit in the main power converter so that a current flowing through the inductor follows a predetermined command value.

7. The bidirectional chopper circuit according to claim 1, further comprising:
a control unit for the one or the plurality of single-phase full-bridge power converters configured to control a power conversion operation of the one or the plurality of single-phase full-bridge power converters so that an AC voltage for canceling an AC voltage component of a voltage appearing at connecting point P of the first switching unit and the second switching unit in the main power converter is output while a DC voltage of a DC capacitor connected at a DC input/output side of a respective single-phase full-bridge power converter is held at a predetermined voltage.

8. A bidirectional chopper circuit that performs voltage conversion between a first DC voltage across a pair of first external connection terminals and a second DC voltage across a pair of second external connection terminals, comprising:
a main power converter including a first switching unit and a second switching unit, which are connected in series with each other so that conduction directions in an ON state are aligned and one of which is turned OFF when the other is turned ON, the main power converter having, as the first external connection terminals, both terminals on a side opposite to a side on which the first switching unit and the second switching unit are connected;

one or a plurality of single-phase full-bridge power converters cascaded with each other provided on a wiring line that branches from a wiring line connecting the first switching unit and the second switching unit; and an inductor connected in series with the single-phase full-bridge power converter on the wiring line that branches from the wiring line connecting the first switching unit and the second switching unit, a control unit for the main power converter configured to control duty ratios of the first switching unit and the second switching unit in the main power converter so that a current flowing through the inductor follows a predetermined command value; and a control unit for the one or the plurality of single-phase full-bridge power converters configured to control a power conversion operation of the one or the plurality of single-phase full-bridge power converters so that an AC voltage for canceling an AC voltage component of a voltage appearing at a connecting point of the first switching unit and the second switching unit in the main power converter is output while a DC voltage of a DC capacitor of a single-phase full-bridge power converter is held at a predetermined voltage, wherein, at any position on the wiring line that branches from the wiring line connecting the first switching unit and the second switching unit and is provided with the inductor and the single-phase full-bridge power converter, the pair of second external connection terminals and are provided, wherein on an AC input/output side of each single-phase full-bridge power converter, the inductor or another single-phase full-bridge power converter different from the single-phase full-bridge power converter is connected while on a DC input/output side, the respective DC capacitor is connected.

* * * * *